United States Statutory Invention Registration [19]

[11] Reg. Number: H747

Jacobs et al. [43] Published: Feb. 6, 1990

[54] ACTIVE CONTROL OF SOLID PROPELLANT GENERATORS USING THROAT MODULATION TECHNIQUES AND PROGRAMMABLE COMPENSATION

[75] Inventors: Paul L. Jacobs, Huntsville; J. C. Dunaway, Falkville, both of Ala.

[73] Assignee: The United States of America as represented by the Secretary of the Army, Washington, D.C.

[21] Appl. No.: 383,403

[22] Filed: Jun. 1, 1982

[51] Int. Cl.[4] ..... F02K 1/18

[52] U.S. Cl. ..... 60/242; 60/254

[56] References Cited

U.S. PATENT DOCUMENTS

| | | | |
|---|---|---|---|
| 3,030,769 | 4/1962 | Badders | 60/242 |
| 3,059,425 | 10/1962 | McSherry et al. | 60/242 |
| 3,073,112 | 1/1963 | Blelkamp, Jr. | 60/254 |
| 3,626,697 | 12/1971 | Nunn et al. | 60/254 |
| 3,641,766 | 2/1972 | Uehling | 60/242 |
| 3,759,039 | 9/1974 | Williams | 60/231 |
| 3,948,042 | 4/1976 | Beardsley et al. | 60/242 |

OTHER PUBLICATIONS

Sutton et al., *Rocket Propulsion Elements*, 1976, pp. 358–364.

*Primary Examiner*—Deborah L. Kyle
*Assistant Examiner*—Michael J. Carone
*Attorney, Agent, or Firm*—James T. Deaton; Robert P. Gibson

[57] ABSTRACT

A system for controlling solid propellant gas generators including a microprocessor which has inputs such as the sensed temperature of the gases in the solid propellant gas generator, the pressure within the solid propellant gas generator and/or pre-programmed input control signals to the microprocessor for causing the microprocessor to produce signals that are used to control a modulation valve which in turn controls a thrust nozzle device that controls exhaust gases from the solid propellant gas generator.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACTIVE CONTROL OF SOLID PROPELLANT GENERATORS USING THROAT MODULATION TECHNIQUES AND PROGRAMMABLE COMPENSATION

DEDICATORY CLAUSE

The invention described herein may be manufactured, used, and licensed by or for the Government for governmental purposes without the payment to us of any royalties thereon.

BACKGROUND OF THE INVENTION

In the past, systems have relied on the shape of the internal burning surfaces of a solid propellant to regulate the burning rate and pressure. This very much limits the regulation of the burning rate and pressure since a specific shape must be selected in order to attain a specific pressure. Therefore, there is a need for other means by which the burning rate and pressure of a gas generator can be readily controlled.

Therefore, it is an object of this invention to provide a device which can compensate for propellant grain temperature sensitivity.

Another object of this invention is to provide a device which can compensate for nozzle throat erosion of the solid propellant gas generator.

Still another object of this invention is to provide a device which enables one to preprogram the thrust profile desired of the gas generator.

Yet another object of this invention is to provide control of a solid propellant gas generator which includes a closed loop control for the burning rate, thrust, and flow.

A still further object of this invention is to provide controls whereby inexpensive rocket motor designs can be utilized by relaxing requirements, tolerances, etc., on the solid propellant grain and nozzle.

Still another object of this invention is to provide a control in which multisensor inputs can be accepted to enable control of the motor burn rate in such a way to compensate for multimissile vehicle disturbances.

Still another object of this invention is to provide controls that have flexibility for different mission profiles built into the capabilities of the control software.

A still further object of this invention is to provide a control that has a microprocessor with flexibility and low cost for motor flow and thrust control.

Other objects and advantages of this invention will be obvious to those skilled in this art.

SUMMARY OF THE INVENTION

In accordance with this invention, active control of a solid propellant gas generator is disclosed which includes a solid propellant gas generator rocket motor with pressure and temperature sensors mounted in the solid propellant gas generator and connected to a microprocessor for providing signals in accordance with the pressure and temperature of the solid propellant gas generator with the microprocessor also having the capability of being pre-programmed with other controls for predetermining and therefore pre-programming thrust delivered by a solid propellant gas generator with the signals from the microprocessor being utilized to control thrust modulation control valve means that in turn controls throat modulation device connected to the solid propellant gas generator for controlling the thrust therefrom.

DESCRIPTION OF THE PREFERRED EMBODIMENT

The active control system in accordance with this invention is provided for controlling the gas generated by solid propellant gas generator. Propellant linear burn rate is related to grain pressure or solid propellant gas generator chamber pressure $P_c$ by $r=K_1P_c^n$, where $K_1$ and n are constants for a given grain. The grain pressure or solid propellant gas generator chamber pressure $P_c$ is related to effective throat area by $$P_c = K_2(A_g/A_t)^{\frac{1}{1-n}}$$

where $K_2$ is a parameter for the given grain, $A_g$ is the grain surface area, and $A_t$ is the effective cross-sectional area of the downstream throat. The ratio $(A_g/A_t)$, called $K_n$, is dependent on propellant temperature $T_p$. Knowing this relationship enables control of $P_c$ and thus r by modulating the throat $A_t$ consistent with the value of $T_p$, which can be actively monitored.

Figure 1:
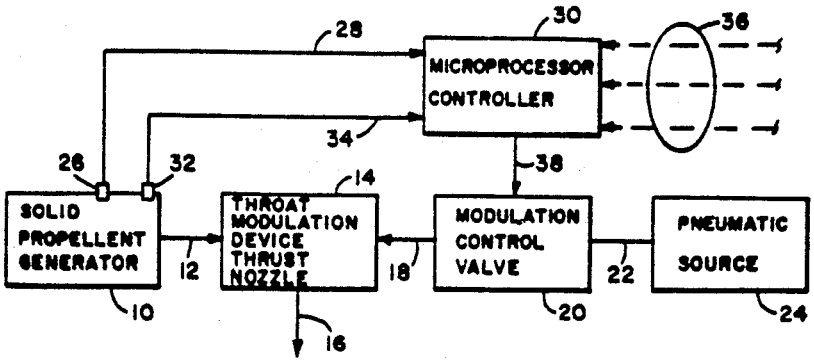
FIG. 1 is a schematic view illustrating the control system in accordance with this invention.
Figure 2:
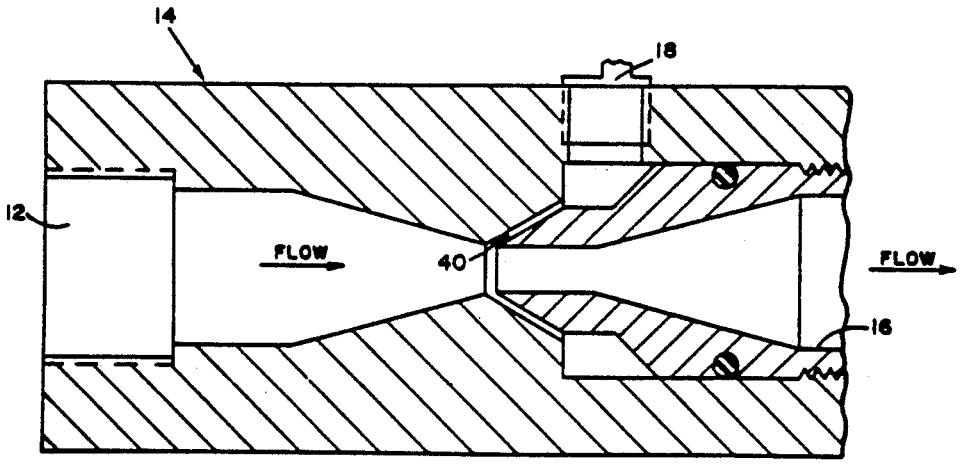
FIG. 2 is a sectional view of a throat modulation device that can be used in this invention.
Figure 3:
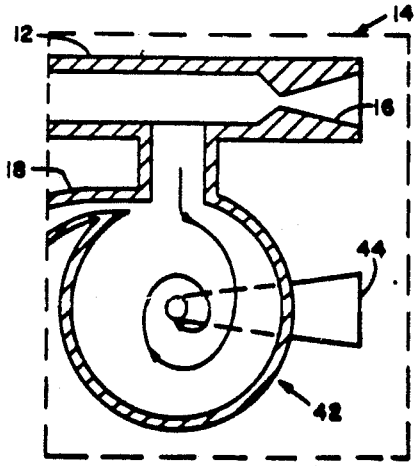
FIG. 3 is a sectional view of another throat modulation device that can be used in accordance with this invention.

Referring now to FIG. 1, the system according to this invention includes a solid propellant gas generator 10 that is connected by line 12 to throat modulation device and thrust nozzle 14 which has an exit nozzle schematically illustrated at 16 and a control line 18 connected thereto for conveying control fluid from modulation control valve 20 that receives its control source through line 22 connected to pneumatic source 24. Temperature control sensor 26 is mounted on solid propellant gas generator 10 for monitoring the temperature of the solid propellant gases produced in solid propellant gas generator 10 and the monitored temperature is transmitted through line 28 to microprocessor controller 30. Also, a pressure sensor 32 is mounted on solid propellant gas generator 10 for monitoring the pressure of the gas produced by solid propellant gas generator 10 and line 34 is used for transmitting the sensed pressure from pressure sensor 32 to microprocessor and controller 30. Also, if desired other predetermined pre-programmed control signals as illustrated at 36 may be provided to microprocessor and controller 30 for modifying the signals processed by microprocessor 30 for causing the desired control signals from microprocessor controller 30 to be transmitted through innerconnection 38 such as an electrical connection to an electrical interface of modulation control valve 20 for controlling an electromechanical, pneumatic, or fluidic modulation control valve. Microprocessor and controller 30 includes a minicomputer that processes the inputs from lines 28 and 34 and/or signals at 36 to produce the desired control through line 38 to modulation control valve 20 which in turn controls the pneumatic source though control line 18 to throat modulation device and thrust nozzle 14 to exhaust 16. Throat modulation device and thrust nozzle 14 can be a nozzle "curtain" modulator arrangement as illustrated in FIG. 2 where fluid entering the inlet passage to control line 18 is injected as a curtain through frustaconical passage 40 to control the flow from line 12 to outlet 16. Also throat modulation device and thrust nozzle 14 can be a vortex valve with a converging inlet, a throat, and a diverging outlet arrangement as illustrated in FIG. 3 where flow from inlet line 12 to outlet 16 is controlled by vortex valve 42 which receives its modulation valve control through the inlet passage of control line 18 to control the amount of flow diverted from line 12 through vortex valve 42 to outlet 44 and thereby control the amount of flow through outlet 16. If neither of the arrangements illustrated in FIGS. 2 and 3 are desired, a mechanical plug nozzle with variable throat could also be used.

In operation, the gas flow rate from solid propellant gas generator 10 is controlled by controlling the nozzle throat area of throat modulation device and thrust nozzle 14. The flow rate at outlet 16 of thrust modulation device and thrust nozzle 14 is controlled by utilizing the solid propellant gas generator chamber pressure $P_c$ of pressure sensor 32 that transmits this pressure signal through line 34 to microprocessor controller 30 and by temperature sensor 26 which senses the temperature of the propellant gases of solid propellant gas generator 10 and the transmission of the temperature signals through line 28 to microprocessor controller 30. A minicomputer of the microprocessor 30 utilizes the pressure signals through line 34 and temperature signals through line 28 to control equation preprogrammed into the microcomputer of the microprocessor to cause appropriate control signals to be generated by the microprocessor controller and to be transmitted through line 38 to modulation control valve 20 which modulates flow from source 24 through line 18 to throat modulation device and thrust nozzle 14 to control the solid propellant gas flow rate out outlet 16. Also, if it is desired to alter the propellant gas flow rate out outlet 16 this may be done by introducing modified input control at 36 to the equations of the minicomputer of the microprocessor controller to alter the flow rate as desired. As can be seen, a closed loop feedback control system is implemented on the solid propellant gas outlet from solid propellant gas generator 10 by this system. Also, it can be seen that the system can also be adjusted to function in relations to conditions external to the closed loop system by the inputs at 36.

We claim:

1. A system for controlling the gas flow rate of a solid propellant comprising a solid propellant gas generator connected to a throat modulation device and thrust nozzle that has an exhaust outlet, a pressure sensor mounted on said solid propellant gas generator and being connected from said pressure sensor to a microprocessor controller for transmitting the chamber pressure of the solid propellant gas to the microprocessor controller, a temperature sensor mounted on said solid propellant gas generator and innerconnecting means connecting said temperature sensor to said microprocessor controller for transmitting said sensed temperatures of said solid propellant gas generator to said microprocessor controller, said microprocessor controller processing said sensed pressures and said sensed temperatures of said solid propellant gas generator and producing control signals, means innerconnecting said microprocessor controller to a modulation control valve, said modulation control valve being connected to a source and said control signals being utilized to control said modulation control valve in such a manner to produce a modulated output from said modulation control valve that is communicated to said throat modulation device and thrust nozzle to cause the thrust produced at the outlet of said throat modulation device and thrust nozzle to be controlled in accordance with the sensed temperature and pressure of said solid propellant gas generator.

2. A control system as defined in claim 1, wherein said microprocessor controller has multiple sensor inputs in addition to said sensed temperature and pressure of said solid propellant gas generator to enable the thrust to be modified in accordance with signals applied at said multiple sensor inputs.

3. A control system as set forth in claim 1, wherein said throat modulation device and thrust nozzle includes a structure with a converging diverging nozzle with a curtain type injection passage opening into said converging diverging nozzle at a position of minimal throat area of the converging diverging nozzle and said flow being injected from said curtain type injection passage at an angle which opposes flow through said converging diverging nozzle.

4. A control system as set forth in claim 1, wherein said throat modulation device and thrust nozzle includes a converging diverging outlet with a vortex valve connected ahead of said converging diverging nozzle for controlling flow through said converging diverging nozzle.

* * * * *